United States Patent
David

(10) Patent No.: US 11,766,969 B2
(45) Date of Patent: Sep. 26, 2023

(54) CONFIGURABLE STORAGE COMPARTMENTS

(71) Applicant: Toyota Motor Engineering & Manufacturing North America, Inc., Plano, TX (US)

(72) Inventor: Mikio David, Ypsilanti, MI (US)

(73) Assignee: Toyota Motor Engineering & Manufacturing North America, Inc., Plano, TX (US)

(*) Notice: Subject to any disclaimer, the term of this patent is extended or adjusted under 35 U.S.C. 154(b) by 0 days.

(21) Appl. No.: 17/564,482

(22) Filed: Dec. 29, 2021

(65) Prior Publication Data

US 2023/0202400 A1    Jun. 29, 2023

(51) Int. Cl.
*B60R 5/04*    (2006.01)

(52) U.S. Cl.
CPC .................. *B60R 5/048* (2013.01)

(58) Field of Classification Search
CPC .. B60R 5/048; B60R 5/00; B60R 5/02; B60R 5/04; B60R 5/044; B60R 5/045; B60R 5/047; B60R 7/00; B60R 11/00; B60R 2011/004
USPC ....... 296/208, 37.1, 26.09, 26.1, 24.3, 26.11, 296/24.4, 24.44, 24.46
See application file for complete search history.

(56) References Cited

U.S. PATENT DOCUMENTS

| 5,598,962 A | * | 2/1997 | Schlachter | ................ B60R 7/02 224/555 |
| 6,050,202 A | | 4/2000 | Thompson | |
| 6,676,184 B2 | * | 1/2004 | Gehring | .................... B60R 7/02 296/37.16 |

(Continued)

FOREIGN PATENT DOCUMENTS

DE    102013212552 A1    12/2014
FR       3083498 A1     1/2020

OTHER PUBLICATIONS

Trunk Gun Locker Safes for Police Vehicles, #SMS-71-CT0100; (http://www.storemorestore.com/Lockers-s/65.htm)>Firearm Lockers (http://www.storemorestore.com./Firearm-Lockers-s/313.htm)>Vehicle Weapon Lockers (http://www.storemorestore.com/Vehicle-Weapon-Lockers-s/3588.htm), pp. 1-4.

(Continued)

*Primary Examiner* — Joseph D. Pape
*Assistant Examiner* — Veronica M Shull
(74) *Attorney, Agent, or Firm* — Dinsmore & Shohl LLP

(57) ABSTRACT

A configurable storage assembly for a storage compartment of a vehicle, the storage assembly including a plurality of panels extendable between a retracted position and an extended position, one or more attachment features coupled to the first end of each wall portion, and one or more receiving features coupled to the vehicle, the receiving features are configured to be selectively coupled to the attachment features. Each panel includes a wall portion having a first end and an opposite second end, the second (Continued)

end of the wall portion extending from a surface of the vehicle. In the retracted position, the attachment feature of each panel is spaced apart from the receiving features. In the extended position, the attachment feature of each panel is coupled to one of the receiving features.

8 Claims, 2 Drawing Sheets

(56) References Cited

U.S. PATENT DOCUMENTS

| | | | | |
|---|---|---|---|---|
| 7,121,601 | B2* | 10/2006 | Mulvihill | B60R 7/02 |
| | | | | 296/37.16 |
| 7,201,421 | B2 | 4/2007 | Reynolds et al. | |
| 7,318,617 | B1* | 1/2008 | Scotton | B60R 5/045 |
| | | | | 224/567 |
| 7,537,257 | B2* | 5/2009 | Watanabe | B60R 7/04 |
| | | | | 296/37.16 |
| 8,215,693 | B2* | 7/2012 | Ulita | B60R 7/02 |
| | | | | 296/37.16 |
| 9,783,116 | B2* | 10/2017 | Huebner | B60R 5/04 |
| 10,336,261 | B2 | 7/2019 | White et al. | |
| 2008/0012372 | A1* | 1/2008 | Squyres | B60P 1/00 |
| | | | | 296/24.44 |
| 2010/0301626 | A1* | 12/2010 | Reid | B60R 5/045 |
| | | | | 296/37.16 |
| 2013/0320694 | A1 | 12/2013 | Dinger et al. | |
| 2018/0015883 | A1* | 1/2018 | Loew | B60R 7/02 |
| 2019/0039523 | A1* | 2/2019 | Szawarski | B60R 5/04 |
| 2020/0070730 | A1* | 3/2020 | Gill | B60R 5/045 |

OTHER PUBLICATIONS

Police Utility Vehicle Tire Organizers Dividers Cargo Areas Small Supply Storage, (https://vww.southwestsolutions.com/ssg/police-utility-vehicle-tire-organizers-dividers-cargo-areas-small-supply-storage), pp. 1-5.

* cited by examiner

CONFIGURABLE STORAGE COMPARTMENTS

TECHNICAL FIELD

The present specification generally relates to storage compartments for vehicles and, more specifically, configurable storage compartments for vehicles.

BACKGROUND

Vehicle compartments include space for storing objects. However, for shared vehicles, any stored objects in the vehicle compartment may become mixed together, causing difficulty in finding objects and determining which objects belong to each of the drivers. Accordingly, a need exists for configurable storage compartments for storing and separating objects stored in a compartment of the vehicle.

SUMMARY

In one embodiment, a configurable storage assembly for a storage compartment of a vehicle, the storage assembly including a plurality of panels extendable between a retracted position and an extended position, one or more attachment features coupled to the first end of each wall portion, and one or more receiving features coupled to the vehicle, the receiving features are configured to be selectively coupled to the attachment features. Each panel includes a wall portion having a first end and an opposite second end, the second end of the wall portion extending from a surface of the vehicle. In the retracted position, the attachment feature of each panel is spaced apart from the receiving features. In the extended position, the attachment feature of each panel is coupled to one of the receiving features.

These and additional features provided by the embodiments described herein will be more fully understood in view of the following detailed description, in conjunction with the drawings.

BRIEF DESCRIPTION OF THE DRAWINGS

The embodiments set forth in the drawings are illustrative and exemplary in nature and not intended to limit the subject matter defined by the claims. The following detailed description of the illustrative embodiments can be understood when read in conjunction with the following drawings, where like structure is indicated with like reference numerals and in which:

DETAILED DESCRIPTION

Figure 1:
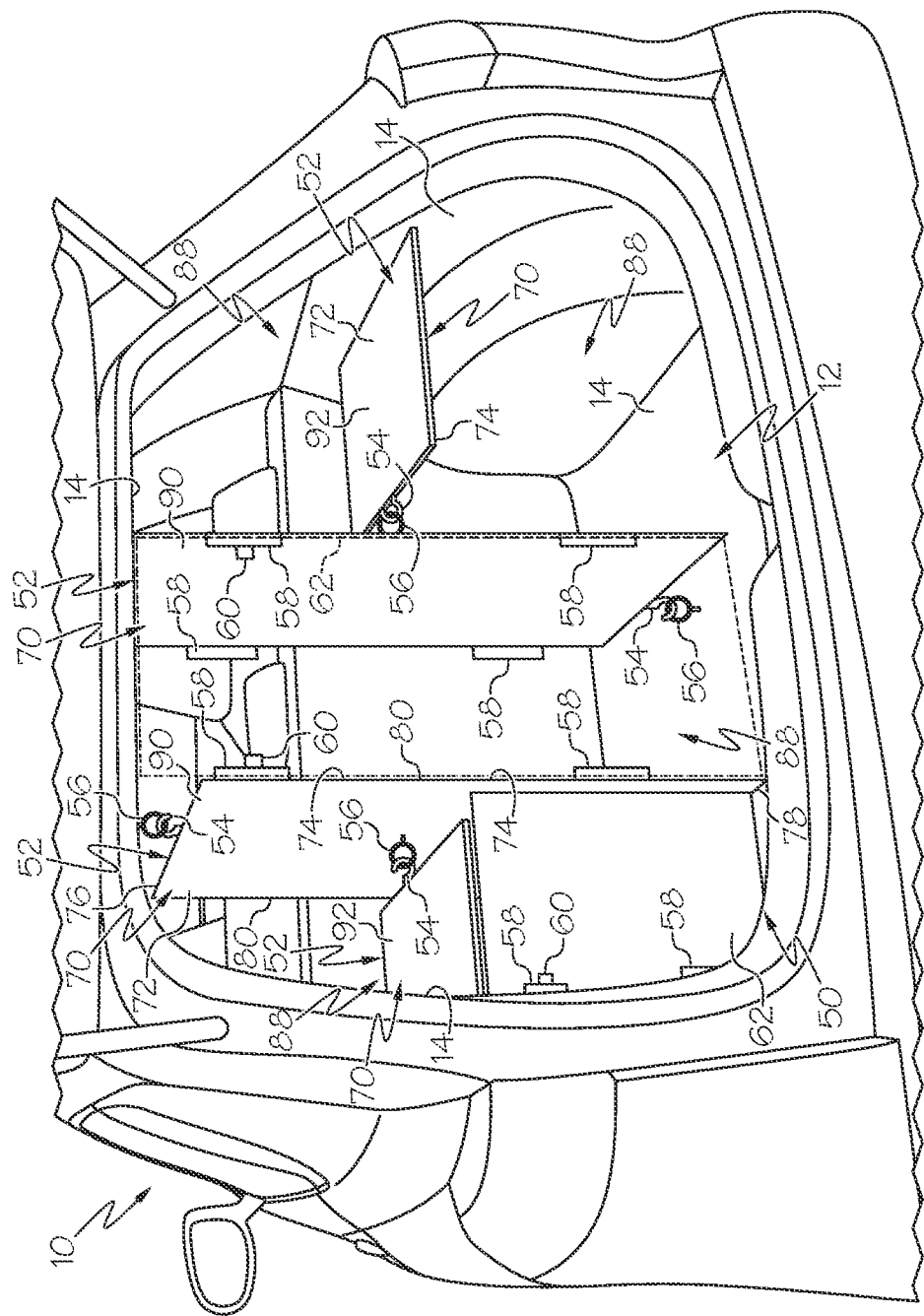
FIG. 1 schematically depicts a perspective view of a configurable storage compartment for a vehicle, according to one or more embodiments shown and described herein.

Embodiments described herein are directed to a configurable storage assembly for a storage compartment of a vehicle. The storage assembly may include a plurality of panels extendable between a retracted position and an extended position, and a plurality of receiving features coupled to the vehicle. Each panel including a wall portion having a first end and an opposite second end, and at least one attachment feature coupled to the wall portion at the first end, the second end of the wall portion extending from the vehicle. The receiving features may be configured to selectively couple to the attachment feature of each panel. In the retracted position, the attachment feature of each panel is spaced apart from the receiving features, and in the extended position, the attachment feature of each panel is coupled to one of the receiving features. Various embodiments of the configurable storage assembly and the operation of the configurable storage assembly are described in more detail herein. Whenever possible, the same reference numerals will be used throughout the drawings to refer to the same or like parts.

Referring now to FIG. 1, a configurable storage assembly 50 for a vehicle 10 is shown. The vehicle 10 may include a plurality of surfaces 14 that define a storage compartment 12 of the vehicle 10. The plurality of surfaces 14 may be the walls, floor, and ceiling of the storage compartment 12. The configurable storage assembly 50 may be positioned in a storage compartment 12 of the vehicle 10. The configurable storage assembly 50 may include a plurality of extendable panels 52, a plurality of attachment features 54, a plurality of receiving features 56, a plurality of hinges 58, a plurality of lock mechanisms 60, and a plurality of doors 62. The storage compartment 12 may be a traditional storage compartment of a vehicle, positioned in a rear of a passenger compartment of the vehicle 10. However, the storage compartment 12 may be another area of a vehicle, such as, for example, a multiple use area of a vehicle that may be converted to a storage area. The multiple use area may include a passenger compartment or a configurable cockpit. It should also be understood that the configurable storage assembly 50 is not limited to being positioned in a storage compartment of a vehicle, and may be separate from a vehicle.

Figure 2:
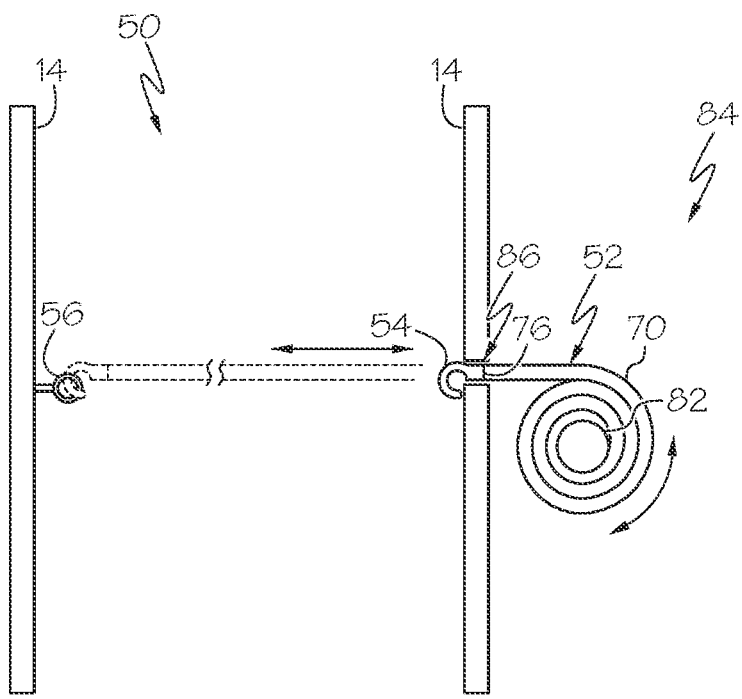
FIG. 2 schematically depicts a partial cross-sectional side view of an extendable panel of the configurable storage compartment of FIG. 1, according to one or more embodiments shown and described herein.

The panels 52 may each include a wall portion 70, and a retraction mechanism 82. The wall portion 70 may be a panel with a first surface 72, an opposite second surface 74, a first end 76, an opposite second end 78, and a pair of edges 80. The attachment features 54 may be coupled to the first end 76 of the wall portion 70 to extend from the first end 76. In embodiments, the attachment features 54 may be coupled to the first surface 72, the second surface 74, or the pair of edges 80. The attachment features 54 may be coupled to the wall portion 70 by, for example, fasteners, adhesive, welding, or the like. The attachment features 54 may be configured to be selectively coupled to the receiving features 56. As depicted in FIGS. 1 and 2, the receiving features 56 may be a hoop and the attachment features 54 may be a hook that may be selectively attached to the hoop. However, the receiving features 56 and the attachment features 54 may be any structure for selectively attaching to each other, such as, for example, magnets.

The wall portion 70 may be coupled to the retraction mechanism 82. The wall portion 70 may be formed of a flexible material to allow the wall portion 70 to wrap around the retraction mechanism 82. For example, the wall portion 70 of the panels 52 may be formed of fabric, rubber, or any other material capable of wrapping around the retraction mechanism 82. The retraction mechanism 82 may be a reel configured to take up and pay out the panel 52 between a retracted position and an extended position. In the retracted position, the attachment feature 54 coupled to the first end 76 of the panel 52 may be spaced apart from the receiving features 56, and positioned closer to the retraction mechanism 82 than the receiving feature 56. The retraction mechanism 82 may include a biasing member that biases the panel 52 toward the retracted position. In embodiments, an actuator may be operatively coupled to the retraction mechanism 82 to extend the panels 52 between the retracted position and the extended position.

Referring to FIGS. 1 and 2, the retraction mechanism 82 may be positioned within a cavity 84 formed in one of the surfaces 14 of the vehicle 10. In such embodiments, the panel 52 may extend out of an opening 86 of the cavity 84 to extend into the storage compartment 12. In the retracted position, the attachment feature 54 and the first end 76 of the panel 52 may be at least partially positioned within, or adjacent to, the opening 86. In the extended position, the panel 52 is extended from the cavity 84 to couple to the receiving feature 56. The panels 52 may extend from the cavity 84 in a vertical direction, a horizontal direction, or both.

The receiving features 56 may be coupled to one or more of the surfaces 14 of the vehicle 10 by, for example, fasteners, adhesive, welding, or the like. The receiving features 56 may be positioned opposite the opening 86 of the cavity 84. When the cavity 84 is formed in one of the surfaces 14 of the vehicle 10, one of the receiving features 56 may be coupled to the opposite surface 14 of the vehicle 10. For example, when the cavity 84 is formed in the floor of the storage compartment 12 of the vehicle 10, the receiving features 56 may be coupled to the ceiling.

The plurality of panels 52 may include one or more vertically extending panels 90 that extend in the vehicle vertical direction, and one or more horizontally extending panels 92 that extend in the vehicle horizontal direction. The retraction mechanism 82 for the vertically extending panels 90 may be positioned in the cavity 84 formed in the floor or the ceiling of the vehicle 10. The retraction mechanism 82 for the horizontally extending panels 92 may be positioned in the cavity 84 formed in one of the side walls of the vehicle 10.

The vertically extending panels 90 may extend from the ceiling to the floor of the vehicle 10. Receiving features 56 may be coupled to one of the first surface 72 and the second surface 74 of the wall portion 70 of the vertically extending panels 90. The receiving features 56 may be configured to selectively couple to the attachment features 54 coupled to the horizontally extending panels 92. The horizontally extending panels state 92 may extend from one of the surfaces 14 to the vertically extending panel 90. In embodiments, the horizontally extending panels 92 may extend from one of the surfaces 14 to the opposite surface 14, and the vertically extending panels 90 may extend from one of the surfaces 14 to the horizontally extending panel 92.

Individual storage compartments 88 may be defined by the surfaces 14, the vertically extending panels 90, the horizontally extending panels s 92, or any combination thereof. The storage compartment 12 may be made up of individual storage compartments 88. The individual storage compartment 88 may comprise an opening to allow access into the individual storage compartment 88.

The hinges 58 may be coupled to at least one of the surfaces 14 and the panels 52. The hinges 58 may be coupled to the pair of edges 80 of the panels 52. The doors 62 may be configured to be selectively coupled to the hinges 58 to enclose one of the individual storage compartments 88. The door 62 may extend across the opening to close off the opening of the individual storage compartment 88, thereby enclosing the individual storage compartment 88. The door 62 may couple to a plurality of the hinges 58 positioned about a periphery of the individual storage compartment 88 that the door 62 encloses. In embodiments, the configurable storage assembly 50 may not include hinges 58, and the doors 62 may be coupled to the vehicle 10 or the panels 52 by any other attachment mechanism.

The lock mechanism 60 may couple to and engage the door 62 and/or the hinge 58. The lock mechanism 60 may be actuated between a locked state and an unlocked state. In the locked state, the lock mechanism 60 may prevent the door 62 from being uncoupled, or removed, from the hinge 58. In the unlocked state, the door 62 may be removed from the hinge 58. The configurable storage assembly 50 may include a plurality of lock mechanisms 60. In embodiments, the configurable storage assembly 50 may include a number of lock mechanisms 60 equal to the number of individual storage compartments 88, such that the lock mechanism 60 for each individual storage compartment 88 may be coupled to any of the hinges 58 positioned about the individual storage compartment 88. In embodiments, the configurable storage assembly 50 may include a number of lock mechanisms 60 equal to the number of hinges 58, such that the doors 62 may be lockably coupled to each of the hinges 58. The lock mechanism 60 may be any locking mechanism, such as, for example, a combination lock, a padlock, a tumbler lock, or the like.

In operation, the storage compartment assembly 50 may begin with the panels 52 in the retracted position. A user may selectively extend one or more of the panels 52 to configure an individual storage compartment 88. The vertically extending panel 90 may be extended from the retracted position to the extended position to attach the attachment feature 54 of the vertically extending panel 90 to one of the receiving features 56. The vertically extending panel 90 may segment the storage compartment 12 into individual storage compartments 88. The horizontally extending panel 92 may be extended from the retracted position to the extended position to attach the attachment feature 54 of the horizontally extending panel strut 92 to the receiving feature 56 positioned on the vertically extending panel 90. The horizontally extending panel 92 may further segment the individual storage compartment 88 at least partially defined by the vertically extending panel 90. Further vertically extending panels 90 and horizontally extending panels 92 may be extended to the extended position to configure additional individual storage compartments 88.

The door 62 may be removably coupled to one of the hinges 58 to enclose one of the individual storage compartments 88. The door 62 may be coupled to multiple hinges 58 positioned about the individual storage compartment 88. The lock mechanism 60 may be coupled to one of the hinges 58 and moved to the locked state to prevent the door 62 from being removed from the hinge 58. Additional doors 62 and lock mechanisms 60 may be coupled to the hinges 58 to enclose and lock further individual storage compartments 88.

The lock mechanism 60 may be moved from the locked state to the unlocked state. When the lock mechanism 60 is in the unlocked state, the door 62 may be removed from the hinge(s) 58. The attachment feature 54 of the horizontally extending panel 92 may be uncoupled from the receiving feature 56, and the horizontally extending panel 92 may be retracted by the retraction mechanism 82 from the extended position to the retracted position. The attachment feature 54 of the vertically extending panel 90 may be uncoupled from the receiving feature 56, and the vertically extending panel 90 may be retracted from the extended position to the retracted position.

Figure 3:
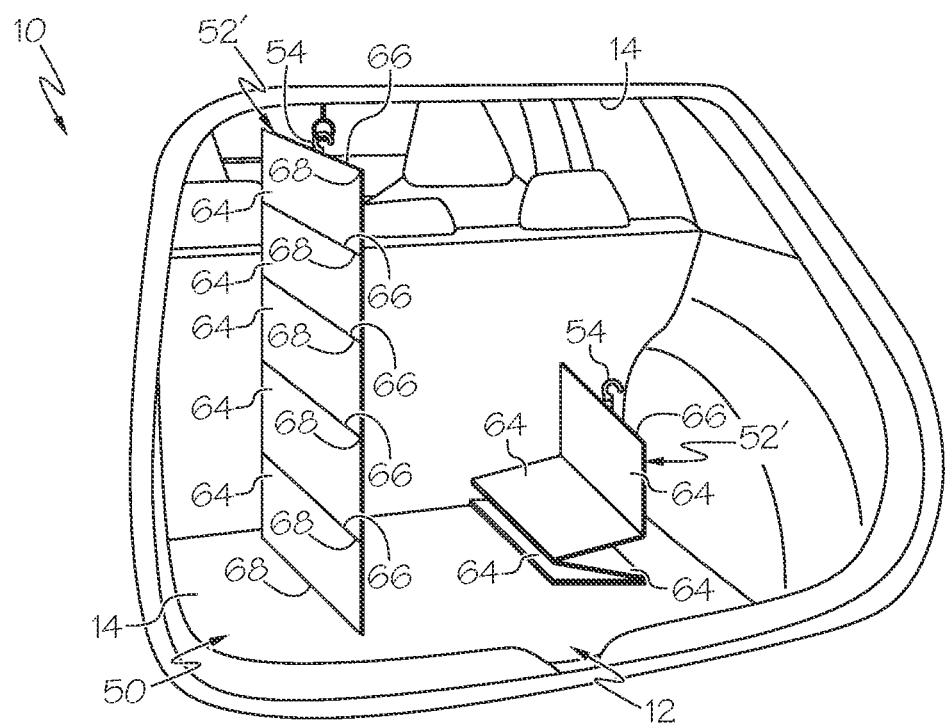
FIG. 3 schematically depicts a perspective view of the configurable storage compartment of FIG. 1 with folding panel, according to one or more embodiments shown and described herein.

Referring to FIG. 3, in embodiments, the configurable storage assembly 50 includes a plurality of alternative extendable panels 52' that include a plurality of folding panels 64. The folding panels 64 may include a plurality of hingedly coupled folding panels that fold and unfold to extend between the extended position and the retracted position. The extendable panels 52' may not include the retraction mechanism 82. The folding panels 64 may be rotatably coupled to one another to allow the folding panels 64 to rotate relative to one another. The folding panels 64 may include a first edge 66 and an opposite second edge 68. The first edge 66 of the folding panel 64 may be rotatably coupled to the second edge 68 of one adjacent folding panel 64. The second edge 68 of the folding panel 64 may be rotatably coupled to the first edge of another adjacent folding panel 64. The other folding panels 64 may be similarly coupled to each adjacent folding panel 64. The attachment feature 54 may be coupled to the first edge 66 of the uppermost folding panel 64, such that the uppermost folding panel 64 may be selectively attached to the receiving feature 56 coupled to and positioned on the surface 14 of the vehicle 10. The lowermost folding panel 64 may be rotatably coupled to the surface 14 of the vehicle 10. In embodiments, the attachment feature 54 may be coupled to the second edge 68 of the lowermost folding panel 64 to allow the extendable panel 52' to selectively attach to a receiving feature 56 coupled to the surface 14. In such embodiments, the uppermost folding panel 64 may be rotatably coupled to the surface 14. The folding panels 64 may be rotatably coupled to the adjacent folding panels 64, the surface 14, and/or the surface 14 by a rotation mechanism, such as, for example, a hinge.

While particular embodiments have been illustrated and described herein, it should be understood that various other changes and modifications may be made without departing from the spirit and scope of the claimed subject matter. Moreover, although various aspects of the claimed subject matter have been described herein, such aspects need not be utilized in combination. It is therefore intended that the appended claims cover all such changes and modifications that are within the scope of the claimed subject matter.

What is claimed is:

1. A configurable storage assembly for a storage compartment of a vehicle, the storage assembly comprising:
   a plurality of panels extendable between a retracted position and an extended position, the plurality of panels comprising:
      a wall portion having a first end and an opposite second end, the second end of the wall portion extending from a surface of the vehicle;
      a horizontally extending panel, the second end of the horizontally extending panel extending from a wall of the vehicle; and
      a vertically extending panel, the second end of the vertically extending panel extending from a floor of the vehicle:
   one or more attachment features coupled to the first end of each wall portion; and
   one or more receiving features coupled to the vehicle, wherein the receiving features are configured to be selectively coupled to the attachment features,
   wherein in the retracted position, the attachment feature coupled to each panel is spaced apart from the receiving features, in the extended position, the attachment feature of each panel is coupled to one of the receiving features, and each of the vertically extending panel and the horizontally extending panel are folding structures comprising a plurality of hingedly coupled folding panels that fold and unfold to extend between the extended position and the retracted position.

2. The configurable storage assembly of claim 1, wherein one of the receiving features is coupled to the vertically extending panel and is configured to receive the attachment feature of the horizontally extending panel when the horizontally extending panel is in the extended position.

3. The configurable storage assembly of claim 2, wherein each panel further comprises a reel coupled to the vehicle that is configured to take up and pay out the panel between the retracted position and the extended position.

4. The configurable storage assembly of claim 3, wherein when the panels are in the retracted position, the panels are at least partially positioned within the wall, a ceiling, or the floor of the storage compartment of the vehicle.

5. The configurable storage assembly of claim 4, further comprising:
   one or more hinges coupled to at least one of the ceiling, the floor, the vertically extending panel, and the horizontally extending panel; and
   a door removably coupleable to the hinges.

6. The configurable storage assembly of claim 5, further comprising:
   a lock mechanism configured to lock the door to the hinges.

7. The configurable storage assembly of claim 6, wherein:
   the configurable storage assembly further comprises an individual storage compartment at least partially defined by the vertically extending panel, the horizontally extending panel, and one of the floor, the wall, and the ceiling,
   the individual storage compartment comprises an opening to allow access to the individual storage compartment, and
   when the door is coupled to the hinges, the door closes off the opening of the individual storage compartment to enclose the individual storage compartment.

8. The configurable storage assembly of claim 7, wherein the attachment feature is a hook.

\* \* \* \* \*

UNITED STATES PATENT AND TRADEMARK OFFICE
CERTIFICATE OF CORRECTION

PATENT NO. : 11,766,969 B2
APPLICATION NO. : 17/564482
DATED : September 26, 2023
INVENTOR(S) : Mikio David It is certified that error appears in the above-identified patent and that said Letters Patent is hereby corrected as shown below:

In the Specification

In Column 3, Line(s) 56, after "panels", delete "s".

In Column 4, Line(s) 41, after "panel", delete "strut".

In the Claims

In Column 6, Line(s) 3, Claim 1, after "vehicle", delete ":" and insert --;--, therefor.

Signed and Sealed this
Twenty-fifth Day of June, 2024

*Katherine Kelly Vidal*

Katherine Kelly Vidal
*Director of the United States Patent and Trademark Office*